United States Patent Office 3,801,661
Patented Apr. 2, 1974

3,801,661
SELECTIVE PROCESS FOR THE CONTINUOUS DYHYDROGENATION OF NONAROMATIC HYDROCARBONS
Peter J. Hart and Hans R. Friedli, Midland, Mich., assignors to The Dow Chemical Company, Midland, Mich.
No Drawing. Filed July 11, 1972, Ser. No. 270,845
Int. Cl. C07c 5/20
U.S. Cl. 260—666 A
10 Claims

ABSTRACT OF THE DISCLOSURE

A selective process for the continuous dehydrogenation of nonaromatic $C_3$–$C_5$ hydrocarbons to derivatives having a higher degree of unsaturation comprising passing a mixture of the hydrocarbon, steam and $H_2S$ through a sulfided metal catalyst at a conversion below about 70%.

BACKGROUND OF THE INVENTION

Catalytic dehydrogenations of $C_3$–$C_5$ nonaromatic hydrocarbons to olefins and diolefins have suffered from two major problems, in that the dehydrogenations are not sufficiently selective and thereby tend to effect cracking to ethylene or even to carbon; and, secondly, in that they are cyclic, which require alternate dehydrogenation and catalyst regeneration cycles, because of loss of catalytic activity. When $Cr_2O_3$ is used as a dehydrogenation catalyst, either in bulk or on a support, the addition of steam or water vapor to the reactor must be avoided because of the rapid loss of catalytic activity in its presence. Carbon deposits form on the catalyst surface which necessitates burn-off after a short dehydrogenation cycle. Substitution of other diluents, e.g., helium for steam, does not alleviate the catalyst coking problem.

Recently a process for catalytically dehydrogenating compounds by adding oxygen and $H_2S$, sulfur, or a sulfur-containing compound to the feed has been disclosed in U.S. Pats. 3,585,248; 3,585,249 and 3,585,250. The process appears to rely on conversion of the sulfur-containing compounds to $SO_2$ for its effectiveness.

Sulfided metal catalysts are known to be useful for hydrodesulfurization of hydrocarbons. Certain sulfided catalysts, specifically Ni/Ce or Co/Ce catalysts, with or without alkaline earth metal promoters, are disclosed in U.S. patent application Ser. No. 164,150 as useful for dehydrogenating alkanes of 2 to 10 C atoms to alkenes. In this process, no steam or $H_2S$ is employed. A noncatalytic, $H_2S$ promoted process for dehydrogenating propane to propylene without use of steam is disclosed in application Ser. No. 157,653.

SUMMARY OF THE INVENTION

This invention relates to a continuous process for dehydrogenating $C_3$–$C_5$ nonaromatic hydrocarbons to derivatives having a greater degree of olefinic unsaturation by passing a mixture of $C_3$–$C_5$ hydrocarbon, steam and $H_2S$ through a bed of a sulfided metal catalyst at a conversion below about 70%, preferably at a conversion of from about 30 to about 50%. The temperature range can vary from about 550° C. to a temperature below about 750° C., and preferably not higher than about 700° C. Optimum operating temperature and other conditions vary with the nature of the hydrocarbon to be processed.

The sulfided catalyst can be tungsten sulfide, nickel sulfide, molybdenum sulfide, cobalt sulfide, sulfided W/Ni, Mo/Ni and Mo/Co and mixtures thereof. The catalyst can be supported on an inert support such as the several aluminum oxides or on silica, including high silica glass. Preferably the catalyst are unsupported, because they provide more active material and give longer periods of activity than supported catalysts.

The tungsten sulfide/nickel sulfide catalyst can contain from 10 to 70% by weight of tungsten and 1 to 15% by weight of nickel. The molybdenum sulfide/nickel sulfide catalysts can contain from 10% to 60% by weight molybdenum and 1% to 20% by weight of nickel, and the molybdenum sulfide/cobalt sulfide catalysts can contain from 10% to 60% by weight of molybdenum and 1% to 20% by weight of cobalt.

The feed to the reactor comprises a mixture of the $C_3$–$C_5$ hydrocarbon to be dehydrogenated, steam and $H_2S$ or a compound which is decomposed to $H_2S$ under the pressure and temperature conditions of the dehydrogenation reaction.

The molar ratio of ingredients in the feed can range from about 0.5 to about 10 moles of steam, preferably 1–3 moles, and about .01 to about .3 mole of $H_2S$ per mole of $C_3$–$C_5$ hydrocarbon. The amount of $H_2S$ will depend on the catalyst composition. Inert diluents such as nitrogen, the noble gases or $CO_2$ can be included in the feed, but they do not affect the reaction, except by the dilution factor.

The pressure at which the dehydrogenation is effected is preferably autogenous, but subatmospheric and superatmospheric pressures up to about 2 atmospheres can be used.

The temperature range at which dehydrogenation of the hydrocarbon in the feed is effected is from about 550° C. to below 750° C. The preferred temperature range is from about 600° C. to about 700° C. The optimum temperature range will depend partly on the reaction time, partly on the hydrocarbon in the feed and partly on the ratio of feed to other ingredients.

The hourly space velocity (HSV) can range from about 200 to about 1000. It is to be understood that space velocity for any given reactor volume can be controlled in part by pressure, in part by the temperature and in part by the addition of inert diluents.

The examples which follow are intended to be illustrative, not limitations. All parts or percentages are by weight, unless otherwise specifically indicated.

Example 1

The reactor was a high silica (Vycor®) glass tube 25 inches long having an outer diameter of ½ inch. It was fitted with a high silica glass thermocouple well running down the axis of the reactor. The reactor was loaded with 5 ml. of 14–25 mesh catalyst held between an upper and a lower layer of 14–25 mesh high silica glass chips.

The hydrocarbon feed and $H_2S$ were metered through calibrated rotameters and water was fed by means of a calibrated syringe pump. The water was vaporized to steam in a preheater zone and all gaseous ingredients were mixed before entering the catalyst bed.

The reactor tube was heated with a 3-zone electrical resistance furnace fitted with a proportional temperature controller. A knock-out trap was used downstream from the reactor to remove liquid product, which consisted essentially of all water.

The gases were sampled directly into a gas chromatograph and analyzed at 30 minute intervals, for CO, $CO_2$, $CH_4$, olefins, diolefins and unreacted feed. Nitrogen was used as an internal standard to calculate carbon balances. At steady-state typical balances were 95–99%.

In this run, the hydrocarbon was a commercial grade propane. It was mixed with two volumes of steam and 0.2 volume of $H_2S$ prior to contact with the catalyst. The hourly space velocity was calculated to 520 h.$^{-1}$. Sulfided W/Ni, Mo, Mo/Ni and Mo/Co catalysts were tested with only minor, indistinguishable deviations. Conversions were varied by increasing reaction temperature.

Tabulated below are the data obtained at 30, 50 and 70% conversion per pass of the propane. The catalyst in this instance contained about 60% W, 11% Ni and 28% S by weight.

TABLE I

|  | Conversion percent | | |
| --- | --- | --- | --- |
|  | 30 | 50 | 70 |
| Selectivity percent: | | | |
| $CH_4$ | 17 | 20 | 20 |
| $C_2H_4$ | 23 | 28 | 31 |
| $C_3H_6$ | 56 | 48 | 45 |

For comparative purposes, runs in which the propane was thermally cracked, without $H_2S$, and other runs in which noncatalytic conversions with $H_2S$ were made. The proportion of $H_2S$ and steam in the latter runs was the same as those reported above.

The data obtained in these runs are tabulated below.

TABLE II

|  | Conversion percent | | | | | |
| --- | --- | --- | --- | --- | --- | --- |
|  | 30 | | 50 | | 70 | |
|  | Thermal | $H_2S$ | Thermal | $H_2S$ | Thermal | $H_2S$ |
| Selectivity percent: | | | | | | |
| $CH_4$ | 17 | 19 | 19 | 19 | 21 | 19 |
| $C_2H_4$ | 37 | 36 | 41 | 34 | 46 | 34 |
| $C_3H_6$ | 43 | 44 | 36 | 44 | 28 | 44 |

Comparison of these data with those of Table I show that at 30% conversion, the selectivity for dehydrogenation of propane to propylene is much higher than that for the thermal or $H_2S$ promoted dehydrogenation. Similarly, at 50% conversion, there is a significantly higher selectivity to propylene as compared with the $H_2S$ promoted dehydrogenation. At 70% conversion, however, the selectivities of the $H_2S$ promoted and $H_2S$ plus catalyst procedures are not markedly different.

Example 2

The reactor and general procedure described above were used for runs with cyclopentane as the hydrocarbon in the feed. The cyclopentane feed rate was 30 ml. min.$^{-1}$, the steam feed rate was 60 ml. min.$^{-1}$ and the $H_2S$ feed rate was 3–6 ml. min.$^{-1}$. The calculated space velocity was about 600 h.$^{-1}$. The catalyst contained 60% W, 11% Ni and 28% S.

During the tests, the following data were obtained.

TABLE III

|  | Conversion per pass, percent | | |
| --- | --- | --- | --- |
|  | 28.5 | 22.9 | 9.5 |
| Temperature, ° C | 685 | 665 | 630 |
| Selectivity percent: | | | |
| Cyclopentene | 26.5 | 35.0 | 62.1 |
| Cyclopentadiene | 25.5 | 26.7 | 15.5 |
| Propylene | 30.0 | 24.5 | 17.5 |
| Ethylene | 18.0 | 13.8 | 4.9 |

Example 3

The general procedure, catalyst and equipment described in the above examples were used in these tests. n-Butane was the hydrocarbon and its freed rate, steam ratio and $H_2S$ ratio were the same as in Example 2. The temperature was 690° C. and the calculated space velocity was about 600 h.$^{-1}$. Data from the test and those from a comparative $H_2S$ promoted run using the same reactant ratios and conditions are given below.

TABLE IV

|  | Conversion percent | |
| --- | --- | --- |
|  | $H_2S$ | W/Ni sulfided catalyst |
| Selectivity percent: | 49.1 | 57.9 |
| $CH_4$ | 13.7 | 12.1 |
| $C_2H_4$ | 27.5 | 12.3 |
| $C_2H_6$ | 9.6 | 8.7 |
| $C_3H_6$ | 49.1 | 62.4 |

Butenes are converted to a mixture containing butadiene, propylene and ethylene under less severe conditions than butane. Thus, either a high space velocity (low reaction time) or a temperature below 700° C. and preferably below about 685° C. is desired. However, at about 70% conversion, the catalytic and noncatalytic, but $H_2S$ promoted, reactions tend to yield the same end products in about the same percentages.

When the feed consists of isobutane, the proportions of dehydrogenated, unsaturated end products vary considerably at conversions below 70%, but as the conversion figure reaches 70% and increases beyond it, the selectivity of dehydrogenation in the $H_2S$ activated and the catalytic procedures tend to converge, so that differences become only slightly significant.

Compounds which can be used place of $H_2S$ include the lower molecular weight mercaptans, particularly the $C_1$–$C_4$ mercaptans and most particularly the butyl and isobutyl mercaptans.

We claim:

1. A continuous method of dehydrogenating $C_3$–$C_5$ alkane and $C_4$–$C_5$ monoalkene hydrocarbons to produce deviratives with greater degrees of olefinic unsaturation comprising passing a vaporized mixture consisting essentially of from about 0.5 to about 10 moles of steam and from about .01 to about 0.3 mole of $H_2S$ or a $C_1$–$C_4$ mercaptan per mole of hydrocarbon at a temperature of 550° C. to below about 750° C. and an hourly space velocity of from about 200 to about 1000 over tungsten sulfide, nickel sulfide, molybdenum sulfide, cobalt sulfide, a sulfided tungsten-nickel containing 10–70 weight percent tungsten and 1–15 weight percent nickel, a sulfided molybdenum-nickel containing 10–60 weight percent molybdenum and 1–20 weight percent nickel or a sulfided molybdenum-cobalt catalyst containing 10–60 weight percent molybdenum and 1–20 weight percent cobalt or a mixture of said catalysts the dehydrogenation of said hydrocarbon being between 30% and 70%.

2. The method of claim 1 in which the hydrocarbon in the feed is propane.

3. The method of claim 1 in which the hydrocarbon in the feed is n-butane.

4. The method of claim 1 in which the hydrocarbon in the feed is cyclopentane.

5. The method of claim 1 in which the temperature is not higher than about 700° C. and the catalyst is a sulfided tungsten-nickel.

6. The method of claim 1 in which the catalyst is a sulfided molybdenum-nickel and the temperature is not higher than about 700° C.

7. The method of claim 1 in which the catalyst is a sulfided molybdenum and the temperature is not higher than about 700° C.

8. The method of claim 1 in which the catalyst is a sulfided molybdenum-cobalt and the temperature is not above about 700° C.

9. The method of claim 1 in which the hydrocarbon is propane, the catalyst is a sulfided tungsten-nickel and the temperature is not greater than 700° C.

10. The method of claim 1 in which the hydrocarbon is propane, the $H_2S$ is about 0.1 to 2 moles and the steam is about 2 moles per mole of hydrocarbon, the catalyst is a sulfided tungsten-nickel, the space velocity is from about 500 to about 550 and the conversion per pass is not higher than about 70%.

References Cited
UNITED STATES PATENTS

| | | | |
|---|---|---|---|
| 2,131,089 | 9/1938 | Beeck et al. | 260—683.3 |
| 2,772,315 | 11/1956 | Hadden | 260—683.3 |
| 3,321,545 | 5/1967 | Rigney et al. | 260—683.3 |
| 3,585,249 | 6/1971 | Cohere | 260—666 A |
| 3,387,054 | 6/1968 | Schuman | 260—683.3 |

DELBERT E. GANTZ, Primary Examiner

V. O'KEEFE, Assistant Examiner

U.S. Cl. X.R.

260—680, 683.3

UNITED STATES PATENT OFFICE
CERTIFICATE OF CORRECTION

Patent No. 3,801,661　　　　　　　　Dated April 2, 1974

Inventor(s) Peter J. Hart and Hans R. Friedli

It is certified that error appears in the above-identified patent and that said Letters Patent are hereby corrected as shown below:

Column 1, line 2, delete "DYHYDROGENATION" and insert --DEHYDROGENATION--.

Column 2, line 66, insert --be-- after the word "to" and before the number "520".

Column 3, line 71, delete "freed" and insert --feed--.

Column 4, line 32, after the word "used" insert --in--.

Column 4, line 39, delete "deviratives" and insert --derivatives--.

Column 6, line 2, delete "Cohere" and insert --Cohen--.

Signed and sealed this 10th day of September 1974.

(SEAL)
Attest:

McCOY M. GIBSON, JR.
Attesting Officer

C. MARSHALL DANN
Commissioner of Patents